US011354050B2

(12) United States Patent
Liu et al.

(10) Patent No.: US 11,354,050 B2
(45) Date of Patent: Jun. 7, 2022

(54) DATA PROCESSING METHOD, APPARATUS, AND COMPUTING DEVICE

(71) Applicant: Alibaba Group Holding Limited, Grand Cayman (KY)

(72) Inventors: Jinxin Liu, Beijing (CN); Chengyu Dong, Beijing (CN); Shanyang Liu, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 21 days.

(21) Appl. No.: 16/924,028

(22) Filed: Jul. 8, 2020

(65) Prior Publication Data

US 2020/0341661 A1 Oct. 29, 2020

Related U.S. Application Data

(63) Continuation of application No. PCT/CN2019/070580, filed on Jan. 7, 2019.

(30) Foreign Application Priority Data

Jan. 9, 2018 (CN) .......................... 201810020121.0

(51) Int. Cl.
*G06F 3/06* (2006.01)

(52) U.S. Cl.
CPC .......... *G06F 3/0631* (2013.01); *G06F 3/0604* (2013.01); *G06F 3/0653* (2013.01); *G06F 3/0659* (2013.01); *G06F 3/0673* (2013.01)

(58) Field of Classification Search
CPC ............................. G06F 3/061; G06F 12/0246
See application file for complete search history.

(56) References Cited

U.S. PATENT DOCUMENTS

| 6,813,684 | B2 | 11/2004 | Sakaguchi et al. |
| 7,814,271 | B2 | 10/2010 | Krantz et al. |
| 8,327,076 | B2 | 12/2012 | Murphy et al. |
| 8,352,685 | B2 | 1/2013 | Bannon et al. |
| 8,484,408 | B2 | 7/2013 | Hetzler et al. |
| 8,677,058 | B2 | 3/2014 | Jung et al. |
| 8,812,771 | B2 | 8/2014 | Yim et al. |

(Continued)

FOREIGN PATENT DOCUMENTS

| CN | 101382948 A | 3/2009 |
| CN | 105159607 | 12/2015 |

(Continued)

OTHER PUBLICATIONS

Translation of Office Action for corresponding CN Application No. 201810020121.0 dated Jun. 16, 2021, a counterpart foreign application for U.S. Appl. No. 16/924,028, 10 pages.

(Continued)

*Primary Examiner* — Gary W. Cygiel
(74) *Attorney, Agent, or Firm* — Lee & Hayes, P.C.

(57) ABSTRACT

Data processing method, apparatus, and mobile terminal are provided. A requesting end adds a reserved field to data to be stored to obtain target data, and sends the target data to a storing end. The storing end allocates a memory to cache the target data, generates data metadata of the data to be stored in the target data, and writes the data metadata to a memory location corresponding to the reserved field in the memory. The embodiments of the present disclosure realize zero copying, ensure the efficiency of data storage, and improve the system performance.

18 Claims, 11 Drawing Sheets

(56) References Cited

U.S. PATENT DOCUMENTS

| | | |
|---|---|---|
| 9,058,162 B2 | 6/2015 | Adachi et al. |
| 9,405,485 B2 | 8/2016 | Lee et al. |
| 9,563,549 B2 | 2/2017 | Ahn et al. |
| 10,095,613 B2 | 10/2018 | Jo et al. |
| 2008/0025706 A1 | 1/2008 | Yoshida et al. |
| 2009/0154000 A1 | 6/2009 | Kojima |
| 2010/0070735 A1 | 3/2010 | Chen et al. |
| 2010/0174864 A1 | 7/2010 | Bar-El |
| 2010/0241802 A1 | 9/2010 | Igashira et al. |
| 2011/0022774 A1 | 1/2011 | Takada et al. |
| 2016/0224260 A1 | 8/2016 | Bandic |
| 2017/0123991 A1 | 5/2017 | Sela et al. |
| 2019/0102291 A1* | 4/2019 | Zhou .................. G06F 3/0659 |

FOREIGN PATENT DOCUMENTS

| | | |
|---|---|---|
| CN | 105389128 | 3/2016 |
| CN | 106294193 A | 1/2017 |
| CN | 107122140 A | 9/2017 |
| CN | 107656939 A | 2/2018 |
| JP | 2010009698 A | 1/2010 |

OTHER PUBLICATIONS

Translation of Search Report for corresponding CN Application No. 201810020121.0 dated Jun. 7, 2021, a counterpart foreign application for U.S. Appl. No. 16/924,028, 2 pages.

Translation of International Search Report for corresponding PCT Application No. PCT/CN2019/070580 dated Mar. 29, 2019, a counterpart foreign application for U.S. Appl. No. 16/924,028, 2 pages.

Translation of Written Opinion for corresponding PCT Application No. PCT/CN2019/070580 dated Mar. 29, 2019, a counterpart foreign application for U.S. Appl. No. 16/924,028, 4 pages.

Extended European Search Report dated Sep. 23, 2021 for European Patent Application No. 19738475.3, 8 pages.

* cited by examiner

DATA PROCESSING METHOD, APPARATUS, AND COMPUTING DEVICE

CROSS REFERENCE TO RELATED PATENT APPLICATIONS

This application claims priority to and is a continuation of PCT Patent Application No. PCT/CN2019/070580 filed on 7 Jan. 2019, and is related to and claims priority to Chinese Application No. 201810020121.0, filed on 9 Jan. 2018 and entitled "Data Processing Method, Apparatus, and Computing Device," which are hereby incorporated by reference in their entirety.

TECHNICAL FIELD

The present disclosure relates to the field of data processing technologies, and particularly to data processing methods, apparatuses, and systems.

BACKGROUND

When storing data, a storage system usually adds metadata describing relevant attributes (which is also known as data metadata) of data to be stored at the end of the data to be stored in order to ensure data security, so that the data to be stored and the data metadata can be written to a storage device at one time.

When receiving data to be stored that is sent by a requesting end, a storing end will passively allocate a piece of memory having a data size that is the same as that of the data to be stored to cache the data to be stored. In order to ensure that the data to be stored and data metadata can be written to a storage device at one time, an implementation method of existing technologies is to reapply for a piece of write disk memory, a size of the write disk memory being a data size of data to be stored plus a data size of data metadata, and then to copy the data to be stored to the write disk memory and splice the data metadata in the write disk memory, so that the data to be stored and the data metadata are organized together. As such, only one write operation needs to be performed, i.e., the data to be stored and the data metadata in the write disk memory can be written to the storage device as a whole.

However, as can be seen from the above description, in the existing technologies, data to be stored needs to be first copied into a write disk memory by means of data copying, which will affect the efficiency of data storage.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide data processing method, apparatus, and computing device to solve the technical problems of low efficiency of data storage in the existing technologies.

In implementations, the present disclosure provides a data processing method, which includes:
adding a reserved field to data to be stored to obtain target data; and
sending the target data to a storing end, wherein the reserved field is used for writing data metadata of the data to be stored in a corresponding memory location in the storing end, so that the data to be stored and the data metadata are written into a storage device as a whole.

In implementations, the present disclosure provides a data processing method, which includes:
obtaining target data, the target data including a reserved field added by a requesting end to data to be stored;
allocating a second memory to cache the target data;
generating data metadata of the data to be stored in the target data; and
writing the data metadata to a memory location corresponding to the reserved field in the second memory.

In implementations, the present disclosure provides a data processing apparatus, which includes:
a data construction module configured to add a reserved field to data to be stored to obtain target data; and
a data sending module configured to send the target data to a storing end, wherein the reserved field is used for writing data metadata of the data to be stored in a corresponding memory location in the storing end, so that the data to be stored and the data metadata are written into a storage device as a whole.

In implementations, the present disclosure provides a data processing apparatus, which includes:
a data acquisition module configured to obtain target data, the target data including a reserved field added by a requesting end to data to be stored;
a memory allocation module configured to allocate a second memory to cache the target data;
a data generation module configured to generate data metadata of the data to be stored in the target data; and
a data writing module configured to write the data metadata to a memory location corresponding to the reserved field in the second memory.

In implementations, the present disclosure provides a computing device, which includes a storage component and a processing component,
the storage component being configured to store one or more computer instructions, wherein the one or more computer instructions are provided to the processing component for calling and execution; and
the processing component being configured to:
add a reserved field to data to be stored to obtain target data; and
send the target data to a storing end, wherein the reserved field is used for writing data metadata of the data to be stored in a corresponding memory location in the storing end, so that the data to be stored and the data metadata are written into a storage device as a whole.

In implementations, the present disclosure provides a computing device, which includes a storage component and a processing component,
the storage component being configured to store one or more computer instructions, wherein the one or more computer instructions are provided to the processing component for calling and execution; and
the processing component being configured to:
obtain target data, the target data including a reserved field added by a requesting end to data to be stored;
allocate a second memory to cache the target data;

generate data metadata of the data to be stored in the target data; and write the data metadata to a memory location corresponding to the reserved field in the second memory.

In the embodiments of the present disclosure, a requesting end adds a reserved field to data to be stored to construct the data to be stored as target data. A data size of the target data is a sum of a data size of the data to be stored and a data size occupied by the reserved field. The requesting end sends the target data to a storing end. The storing end allocates a memory to cache the target data. Since the reserved field is reserved in the target data, a memory space corresponding to the reserved field can be enough for writing data metadata, so the storing end does not need to allocate new memory, which will not cause a waste of memory and avoid data copying. Therefore, the efficiency of data storage and the performance of an associated system are improved.

These aspects of the present disclosure or other aspects of the present disclosure will become more clear and easier to understand in the description of the following embodiments.

BRIEF DESCRIPTION OF THE DRAWINGS

In order to more clearly explain the embodiments of the present disclosure, accompanying drawings are briefly described herein. Apparently, the described drawings represent some embodiments of the present disclosure. One of ordinary skill in the art can obtain other drawings based on these drawings without making any creative effort.

DETAILED DESCRIPTION

Figure 1:
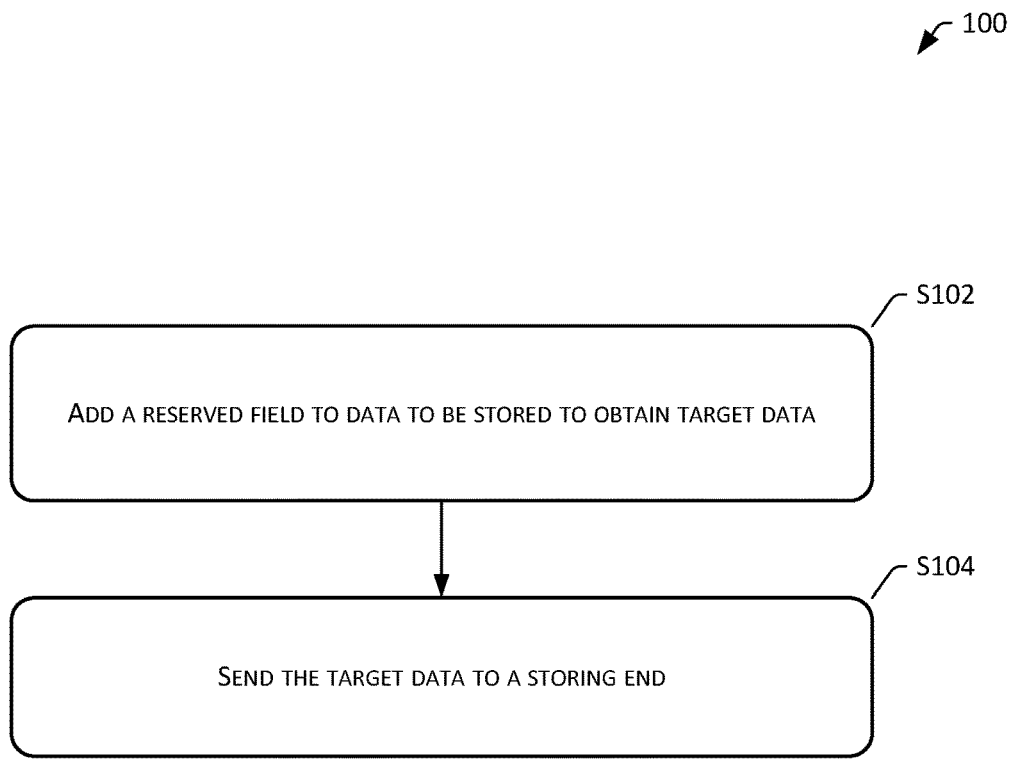
FIG. 1 shows a flowchart of an exemplary data processing method provided by the present disclosure.

In order to enable one skilled in the art to better understand the solutions of the present disclosure, the technical solutions in the embodiments of the present disclosure will be described clearly and completely hereinafter in conjunction with the drawings in the embodiments of the present disclosure.

Some processes described in the specification and claims of the present disclosure and the drawings include multiple operations that appear according to a specific order. However, it should be clearly understood that these operations may not need to be executed in an order in which they appear in the present text or may be executed in parallel. Sequence numbers of operations, such as 101 and 102, etc., are only used for distinguishing between different operations, and the sequence numbers themselves do not represent any sequence of execution. In addition, these processes may include more or fewer operations, and these operations may be performed sequentially or in parallel. It should be noted that descriptions, such as "first" and "second", etc., in the present text, are used for distinguishing different pieces of information, devices, modules, etc., and do not represent an order, nor "first" and "second" are limited to different types.

The technical solutions of the embodiments of the present disclosure are mainly applied to a storage system. The storage system may be a conventional storage system or a distributed storage system.

To facilitate understanding, technical terms that may appear in the embodiments of the present disclosure are first explained as follows.

Storing end: Responsible for data access operations; a conventional storage system uses a centralized storage server for storing data, and a storing end can be referred to as a storage server; a distributed storage system stores data in multiple data storage nodes, and a storing end can be referred to as one or more data storage nodes.

Data storage node: A node responsible for data storage in a distributed storage system, and is usually a physical server.

Requesting end: Responsible for sending read/write requests, and an upper-level service system accesses or updates data of a storing end through the requesting end.

Request metadata: Data guidance information of data to be stored sent by a requesting end to a storing end, which may include a data length and/or a data location of the data to be stored, and storage indication information; storage indication information which is also referred to as indicating a storage device to which the data to be stored is written; the requested metadata is not written to the stored data.

Data Metadata (DataMeta): Metadata used for describing relevant attributes of data to be stored, which may include a data length, a data checksum, a storage location, a file name to which it belongs, etc; the data metadata is written to a storage device with the data to be stored.

Multi-copy technology: A data redundancy technology in a distributed storage system, which normally makes a number of copies of original data in order to prevent a data loss due to a failure of a data storage node; each copy of the data being stored in a different data storage node, and each copy of the original data is called copy data.

Storage device: A hardware device used for storing data in a storage system; data eventually needs to be written to the storage device, which may be a storage medium such as a magnetic disk.

In the existing technologies, in order to write data to be stored and data metadata to a storage device, a storing end needs to allocate an additional write disk memory. Upon receiving data to be stored, the storing end will passively allocate a piece of memory to cache the data to be stored. Therefore, it is necessary to copy the data to be stored to the write disk memory again. The data to be stored needs to be copied once, and copying the data will affect the efficiency of data storage and affect the performance of an associated system.

In order to improve the system performance and ensure the efficiency of data storage, the inventors proposed the technical solutions of the present disclosure through a series of studies. In the embodiments of the present disclosure, a requesting end adds a reserved field to data to be stored to construct the data to be stored as a target data. A data size of the target data is a sum of a data size of the data to be stored and a data size corresponding to the reserved field. The requesting end sends the target data to a storing end. The storing end allocates a piece of memory to cache the target data. Since the target data includes the reserved field, a memory space corresponding to the reserved field would be enough for writing data metadata. Therefore, the storing end does not need to allocate additional and new memory, which will not cause a waste of memory, and at the same time avoid data copying. Therefore, the efficiency of data storage and the system performance can be improved.

The technical solutions in the embodiments of the present disclosure will be described clearly and completely hereinafter in conjunction with the drawings in the embodiments of the present disclosure. Apparently, the described embodiments represent only a part and not all of the embodiments of the present disclosure. Based on the embodiments in the present disclosure, all other embodiments that are obtained by one skilled in the art without making any creative effort will fall within the scope of protection of the present disclosure.

FIG. 1 is a flowchart of an exemplary data processing method 100 according to the present disclosure. The technical solutions of the present disclosure are applied to a requesting end, and the requesting end is responsible for execution.

The method 100 may include the following operations:

S102: Add a reserved field to data to be stored to obtain target data.

In the embodiments of the present disclosure, when constructing a write request, a requesting end adds a reserved field to data to be stored, the reserved field occupying a certain data length. The data to be stored together with the reserved field form a new data format, and constitute target data. A data size of the target data is equal to a sum of a data size of the data to be stored and a data size occupied by the reserved field.

The reserved field may be located at the end of the data to be stored, and the data size occupied thereby is defined in advance, which may be set in conjunction with a data size of data metadata. The data size occupied by the reserved field needs to be greater than or equal to the data size of the data metadata.

In implementations, the data size occupied by the reserved field may be equal to the data size of the data metadata.

The data metadata refers to data metadata of the data to be stored, and is generated based on the data to be stored. Since the data metadata contains information that is usually fixed, sizes of data metadata of different data are usually the same, and the data size occupied by the reserved field may be set accordingly.

It should be noted that a data size involved in the embodiments of the present disclosure is expressed in units of bytes (English: Byte, abbreviation: B) or kilobytes (English: Kbytes, abbreviation: K), and the data size may also be called as a data length.

In implementations, a predetermined character string of a preset size may be added as a reserved field at the end of the data to be stored to obtain target data.

The predetermined character string may be an empty character string or a character string that has been agreed upon.

S104: Send the target data to a storing end.

The requesting end may send a write request that includes the target data to a storing end, and the target data acting as data to be written is sent to the storing end.

After obtaining the target data, the storing end will passively allocate a piece of memory to cache the target data. For convenience of differentiation in the description, the memory that is passively allocated by the storing end to cache the target data is named as "second memory". The storing end may read the data to be stored from the target data and generate data metadata based thereupon. Since the reserved field has been reserved in the target data, the reserved field is sufficient for the data metadata that is to be written. Therefore, the storing end can write the data metadata to a memory location corresponding to the reserved field in the second memory.

In implementations, the reserved field is used for writing the data metadata of the data to be stored in a corresponding memory location in the storing end.

In implementations, the requesting end adds a reserved field to data to be stored to reconstruct as target data. Since a data size of the target data is equal to a sum of a data size of the data to be stored and a data size occupied by the reserved field, a second memory that is passively allocated by the storing end is sufficient for data metadata to be written. As such, there is no need to apply for additional disk write memory, and no data copy is required, thereby achieving zero copying. Therefore, the system performance and the efficiency of data storage can be improved without causing any waste of memory.

Since the data to be stored needs to be temporarily stored in the memory before being sent, in implementations, sending the target data to the storing end may include:

allocating a first memory that is consistent with a data size of the target data;

placing the target data into the first memory; and sending the target data from the first memory to the storing end.

In implementations, the first memory is referred to as a memory allocated for storing the target data that is sent to the storing end, which is named as "first memory" for convenience of differentiation in the description. One skilled in the art can understand that the "first" and "second" in the "first memory" and the "second memory" are merely used for the purpose of differentiation in the description, and do not represent any relationships such as delivery and inclusion.

The requesting end and the storing end can agree on a location of the reserved field in the target data and a location of the data to be stored, for example, the last 32 bytes in the target data as a reserved field. As such, the storing end can follow an agreed-upon rule to read the data to be stored from the target data, and determine the reserved field.

In addition, the requesting end may also send request metadata to the storing end, and the storing end may determine the data to be stored in the target data according to a data length and/or a data location of the data to be stored in the request metadata.

The request metadata may also indicate to which storage device the storing end stores the data to be stored, etc.

Since the data to be stored needs to be temporarily stored in the memory before being sent, the request metadata can also be put into the memory, so that the data to be stored and the request metadata can be sent together.

In implementations, sending the target data to the storing end may include:

calculating a total data size of the target data and the request metadata;

allocating a first memory that is consistent with the total data size;

placing the target memory and the request metadata into the first memory; and sending the target data from the first memory to the storing end.

In a practical application, the technical solutions of the present disclosure can be applied to a distributed storage system. In a distributed storage system, in order to avoid a data loss caused by a failure of a certain data storage node, a multi-copy technology is usually adopted to make a number of copies of original data, and each copy of the data is stored in a different data storage node. Each copy data of the original data is copy data. Therefore, the data to be stored may be referred to as copy data.

Since a distributed storage system is formed by a number of data storage nodes forming a cluster system, there is a need to send data to be stored to multiple data storage nodes for storage. For example, when the data to be stored is copy data, the copy data needs to be sent separately to multiple data storage nodes.

If the data to be stored needs to be sent to multiple data storage nodes, the requesting end needs to send corresponding request metadata for each data storage node. The request metadata that is separately sent to multiple data storage nodes may include a data length of the data to be stored and a data location, etc., and may also include differentiated information corresponding to different data storage nodes, such as storage indication information. The data to be stored may have different requirements for storage in storage devices associated with different data storage nodes.

In implementations, in a distributed storage system, the storing end may include multiple data storage nodes.

Therefore, sending the target data to the storing end includes sending the target data and corresponding request metadata to multiple data storage nodes.

Currently, when a requesting end sends target data and corresponding request metadata to multiple data storage nodes, the requesting end may first calculate a total data size of the target data and one piece of request metadata, allocate a first memory that is consistent with the total data size, and place the target data into the first memory. If the data to be stored is needed to be sent to any one of the data storage nodes, request metadata corresponding to the any data storage node is stitched in the first memory, and the target data and the request metadata is then sent to the any data storage node. If the data to be stored is needed to be sent to another data storage node, request metadata corresponding to the other data storage node is copied into the first memory to overwrite the previous request metadata, and is then sent.

As can be seen from the above description, currently, when sending data to be stored to multiple data storage nodes in this type of method, multiple tedious operations of copying request metadata are needed. This also affects the efficiency of transmission and thus affects the efficiency of data storage.

Figure 2:
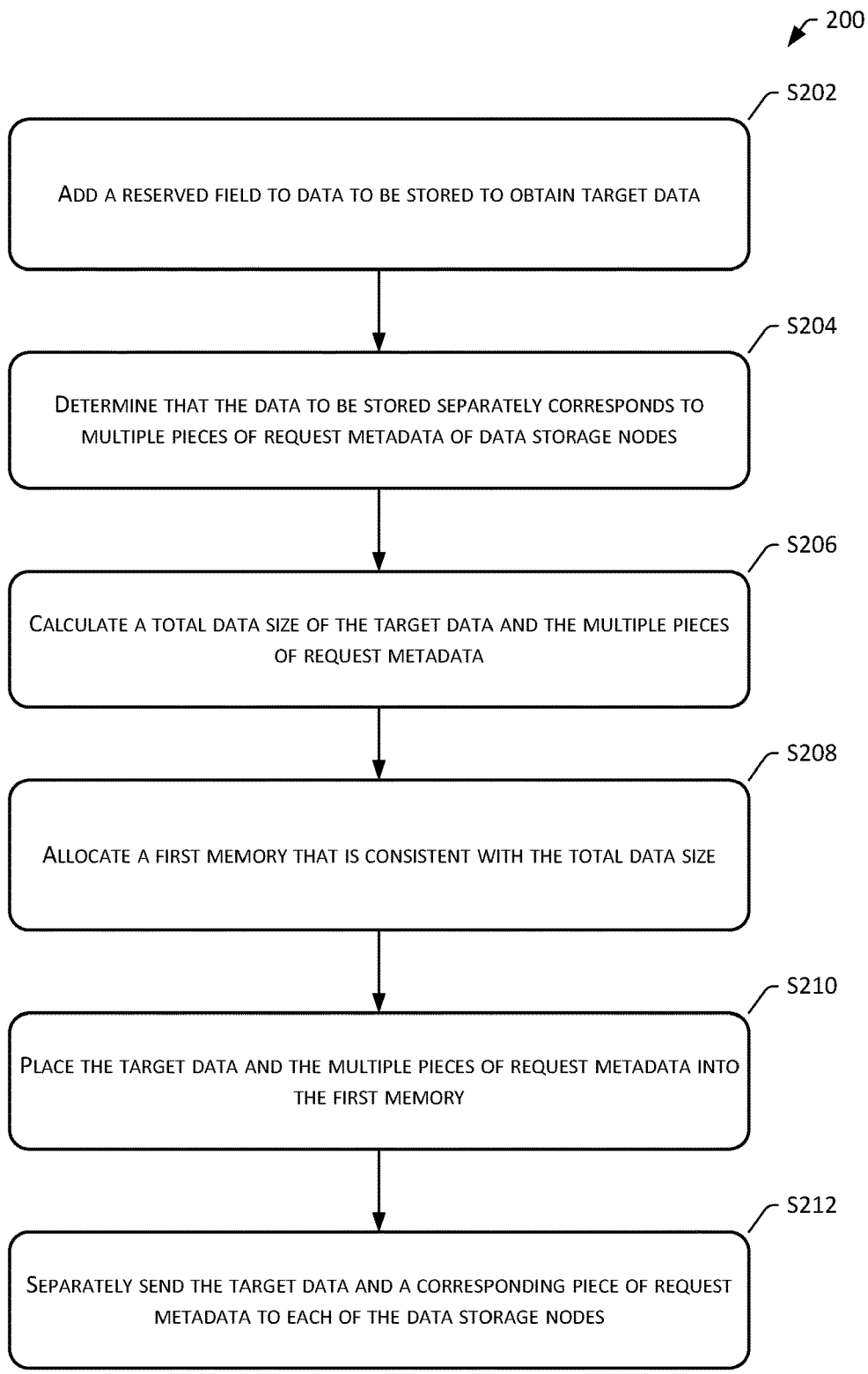
FIG. 2 shows a flowchart of another exemplary data processing method provided by the present disclosure.

FIG. 2 is a flowchart of another exemplary data processing method 200 according to the present disclosure. The method 200 may include the following operations.

S202: Add a reserved field to data to be stored to obtain target data.

S204: Determine that the data to be stored separately corresponds to multiple pieces of request metadata of data storage nodes.

S206: Calculate a total data size of the target data and multiple pieces of request metadata.

S208: Allocate a first memory that is consistent with the total data size.

In other words, a memory size of the first memory may be equal to the total data size.

S210: Place the target data and the multiple pieces of request metadata into the first memory.

The target data may be placed into the first memory first, and the multiple pieces of request metadata may then be sequentially placed into the first memory, and spliced at the end of the target data.

S212: Separately send the target data and a corresponding piece of request metadata to each of the data storage nodes.

A requesting end may separately send write requests to multiple data storage nodes, in order to include target data and a respective piece of request metadata corresponding to each of the multiple data storage nodes.

Specifically, for any data storage node, the target data and request metadata corresponding to the any data storage node in the first memory is sent to the any data storage node.

In the first memory, the multiple pieces of request metadata can be sequentially placed into the first memory according to a sending order of the multiple data storage nodes. For example, a piece of request metadata of a first data storage node which is located as the first one in the sending order is located at the end of the target data, a piece of request data of a second data storage node which is located as the second one in the sending order is located at the end of the piece of request metadata of the first data storage node, and so on. In other words, the multiple pieces of request metadata can be sequentially placed into the first memory. When a write request needs to be sent to any data storage node, since a data size of request metadata is known, a corresponding piece of request metadata can be found according to a sending order associated with the any data storage node.

After any data storage node obtains received data sent by the requesting end, the any data storage node can read a piece of request metadata that it needs from the end of the received data, and can determine data to be stored and a reserved field, etc., from the target data based on the piece of request metadata.

In implementations, the first memory that is allocated can be written with multiple pieces of request metadata, without the need of specializing a piece of request metadata for each data storage node. An execution of a single operation can then lead to data being sent to different data storage nodes. The operation is simpler, and the efficiency of transmission is improved. As such, the efficiency of data storage and the system performance can be improved.

Figure 3:
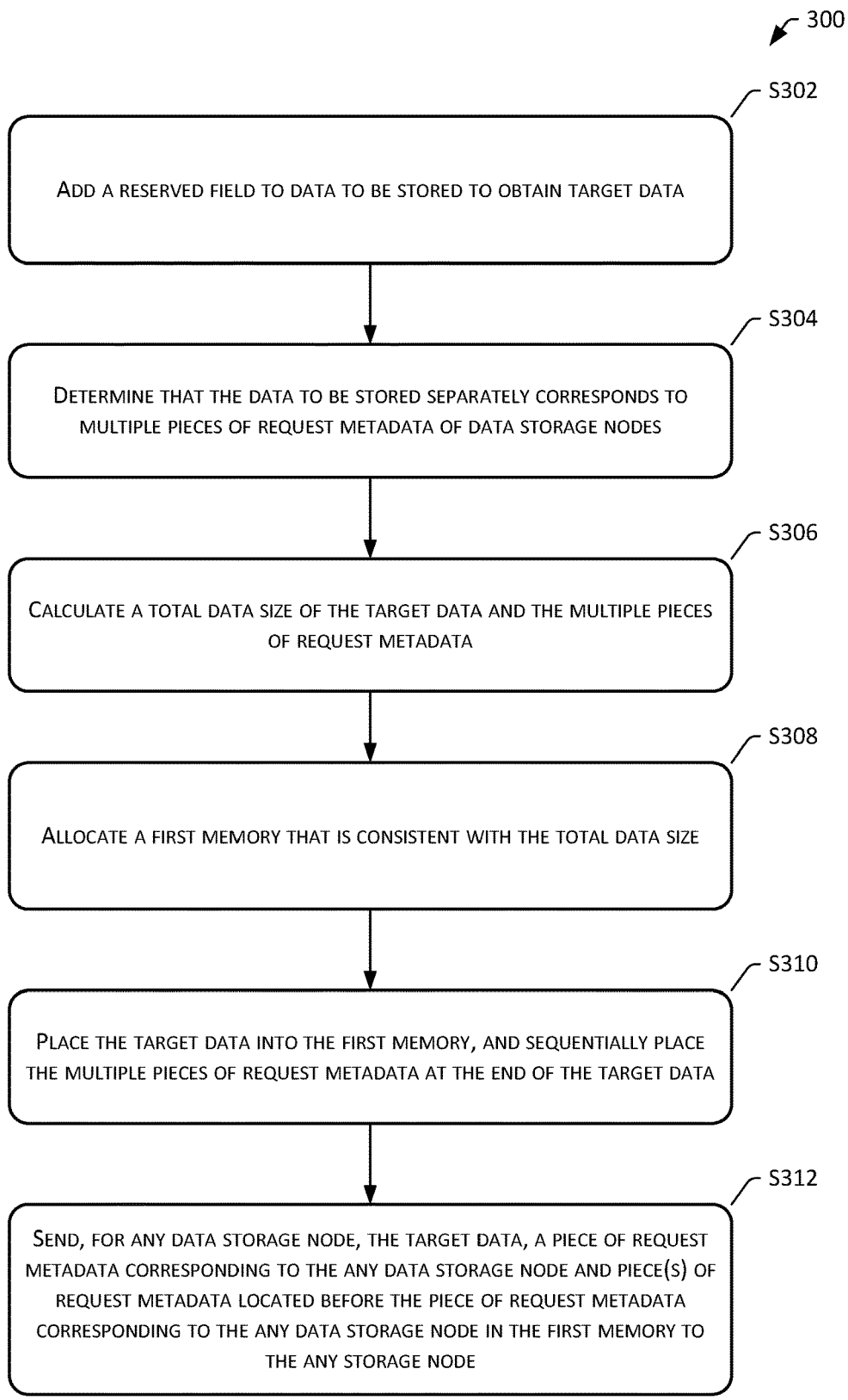
FIG. 3 shows a flowchart of an exemplary data processing method provided by the present disclosure.

In addition, in order to facilitate operations of a requesting end and each data storage node, in implementations, as shown in FIG. 3, a data processing method 300 may include the following operations.

S302: Add a reserved field to data to be stored to obtain target data.

S304: Determine that the data to be stored separately corresponds to multiple pieces of request metadata of data storage nodes.

S306: Calculate a total data size of the target data and the multiple pieces of request metadata.

S308: Allocate a first memory that is consistent with the total data size.

In other words, a memory size of the first memory may be equal to the total data size.

S310: Place the target data into the first memory, and sequentially place the multiple pieces of request metadata at the end of the target data.

The multiple pieces of request metadata can be sequentially placed into the first memory according to a sending order of the data storage nodes. For example, a piece of request metadata of a first data storage node that is the first in the sending order is located at the end of the target data, and a piece of request data of a second data storage node that is the second in the sending order is located at the end of the piece of request metadata of the first data storage node, and so on. In other words, the multiple pieces of request metadata can be sequentially placed into the first memory.

In implementations, sequentially placing the multiple pieces of request metadata at the end of the target data includes:

sequentially placing the multiple pieces of request metadata corresponding to the multiple data storage nodes respectively at the end of the target data according to a sending order of the multiple data storage nodes.

S312: Send, for any data storage node, the target data, a piece of request metadata corresponding to the any data storage node and piece(s) of request metadata located before the piece of request metadata corresponding to the any data storage node in the first memory to the any storage node.

The requesting end may send a write request to any data storage node, in order to carry the target data, a piece of request metadata corresponding to the any data storage node, and piece(s) of request metadata located before the piece of request metadata corresponding to the any data storage node.

The any data storage node is used to read a corresponding piece of request metadata from the end of the received data.

According to a sending order of the multiple data storage nodes, a respective piece of request metadata corresponding to each of the multiple data storage nodes is sequentially placed at the end of the target data.

In implementations, S312 may include:

sending, for the any data storage node, the target data, the piece of request metadata corresponding to a sending order of the any data storage node and the piece(s) of request metadata located before the piece of request metadata corresponding to the sending order of the any data storage node in the first memory to the any storage node.

Using the method 300, based on a data size of a piece of request metadata, a data storage node can parse and obtain a corresponding piece of request metadata from the end of received data.

Since the piece of request metadata includes a data size and/or a data location of the data to be stored, based on the piece of request metadata, data of the data size indicated by the piece of request metadata can be read from the head of the received data, i.e., the data to be stored can be obtained, or the data to be stored can be located and obtained from the received data according to the data location.

Figure 4A:
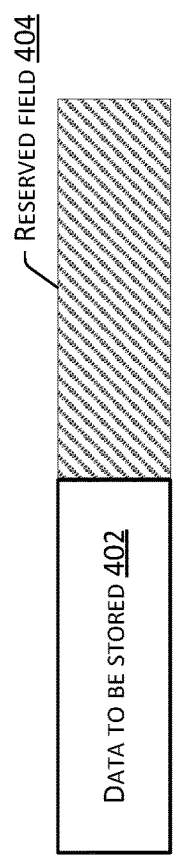
FIG. 4a shows a schematic diagram of a data structure provided by the embodiments of the present disclosure.

For the ease of understanding, three data storage nodes are used as an example below. FIG. 4a is a schematic diagram of a data structure 400A of target data. As can be seen, the target data is composed of data to be stored 402 and a reserved field 404.

Figure 4B:
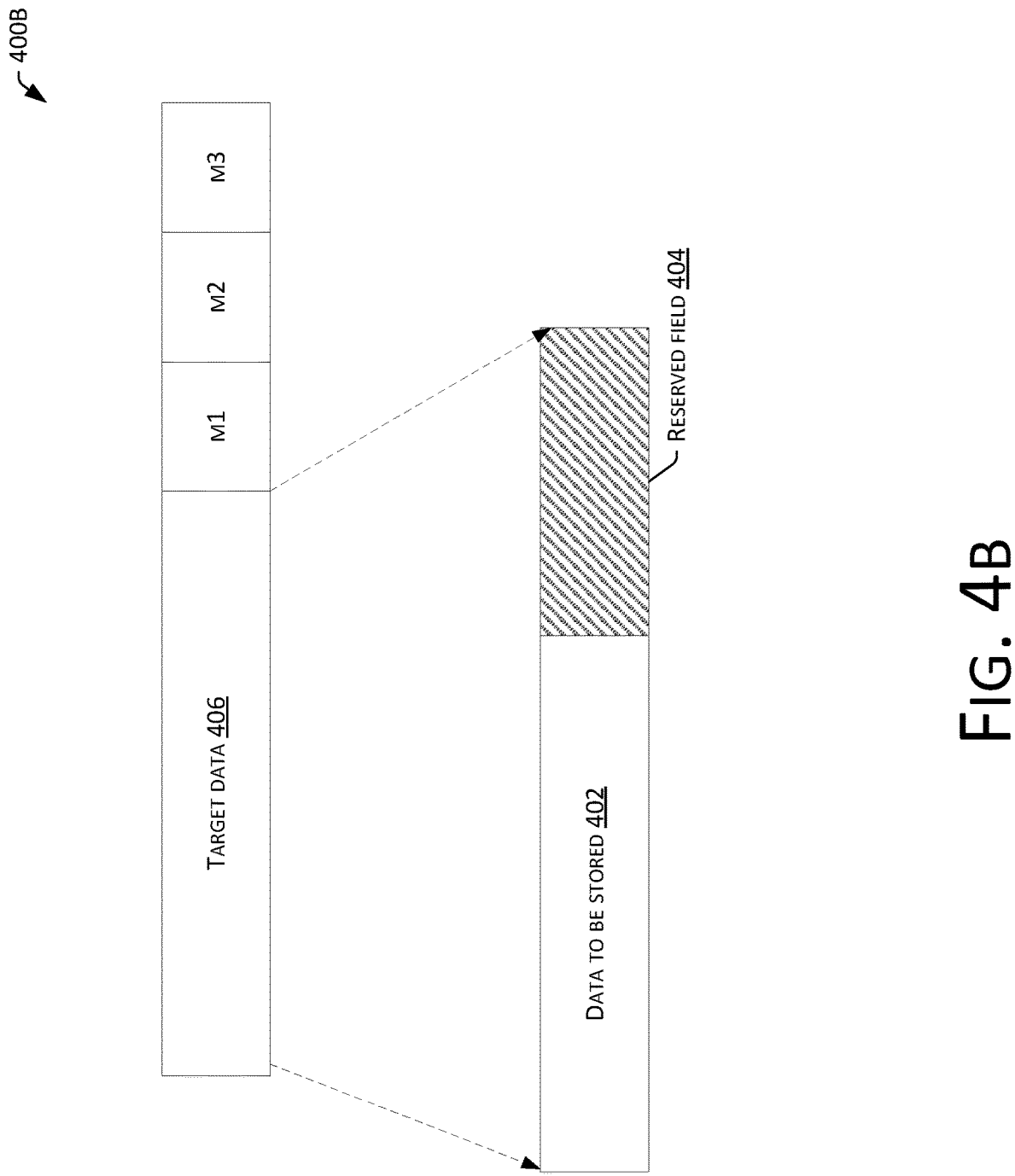
FIG. 4b shows a schematic diagram of another data structure provided by the embodiments of the present disclosure.

FIG. 4b is a schematic diagram of a data structure 400B in a first memory, which consists of target data 406 and three pieces of request metadata m1, m2, and m3 that are sequentially placed at the end of the target data 406.

The three pieces of request metadata can be placed in order according to a sending order of the three data storage nodes, a piece of request metadata m1 corresponds to a first data storage node, a piece of request metadata m2 corresponds to a second data storage node, and a piece of request metadata m3 corresponds to a third data storage node.

In implementations, when performing a write operation to the first data storage node, a requesting end may send the target data 406 and the piece of request metadata m1 to the first data storage node. When performing a write operation to the second data storage node, the requesting end may send the target data 406 and the piece of request metadata m2 to the second data storage node. When performing a write operation to the third data storage node, the requesting end may send the target data 406 and the piece of request metadata m3 to the third data storage node.

In implementations, when performing a write operation to the first data storage node, a requesting end may send the target data 406 and the piece of request metadata m1 to the first data storage node. When performing a write operation to the second data storage node, the requesting end may send the target data 406, the piece of request metadata m1, and the piece of request metadata m2 to the second data storage node. When performing a write operation to the third data storage node, the requesting end may send the target data 406, the piece of request metadata m1, the piece of request metadata m2 and the piece of request metadata m3 to the third data storage node.

Figure 5:
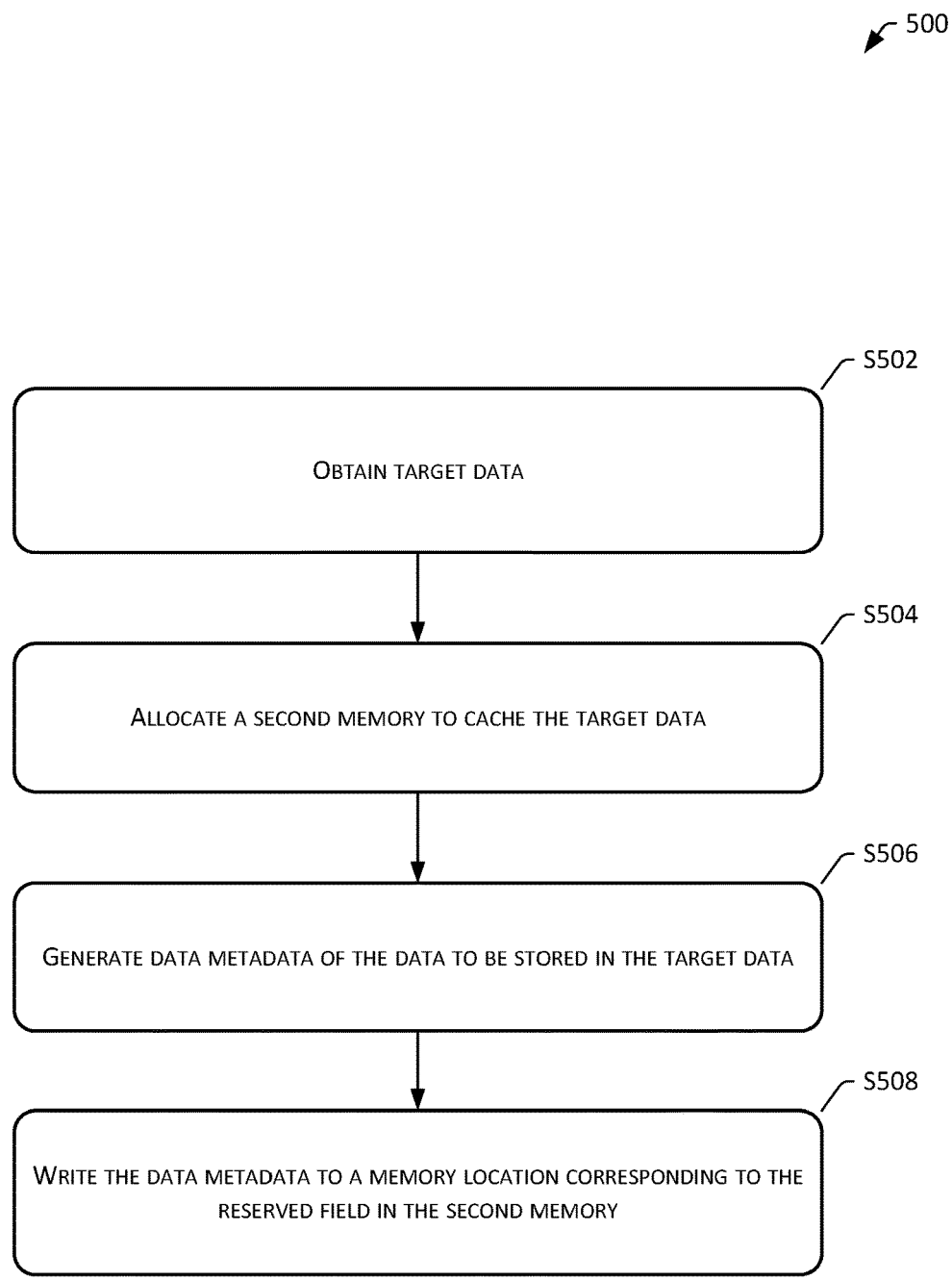
FIG. 5 shows a flowchart of another exemplary data processing method provided by the present disclosure.

FIG. 5 is a flowchart of another exemplary data processing method 500 provided by the present disclosure. The technical solutions of the present disclosure are applied to a storing end. In a conventional storage system, a storage server may execute the method 500. In a distributed storage system, any data storage node may execute the method 500.

The method 500 may include the following operations.

S502: Obtain target data.

The target data is formed by adding a reserved field to data to be stored by a requesting end.

The target data may be included in a write request of the requesting end, and the storing end may obtain the target data from the write request.

S504: Allocate a second memory to cache the target data.

After obtaining the target data, the storing end passively allocates a second memory to temporarily store the target data. A memory size of the second memory is consistent with a data size of the target data.

S506: Generate data metadata of the data to be stored in the target data.

S508: Write the data metadata to a memory location corresponding to the reserved field in the second memory.

After that, the storing end may write the data to be stored in the second memory as a piece of data metadata into a storage device.

A data size occupied by the reserved field is greater than or equal to a data size of the data metadata. Therefore, the second memory has a sufficient space to allow the data metadata to be written. The storing end does not need to allocate additional write disk memory in order to write the data to be stored to the storage device as data metadata. No data copying is needed to be performed, and zero copying is achieved. Therefore, the system performance and the efficiency of data storage can be improved without causing any memory waste.

The requesting end and the storing end can agree upon a location of the reserved field in the target data and a location of the data to be stored. For example, the last 32 bytes in the target data correspond to the reserved field. The storing end can read the data to be stored, and determine the reserved field based on the agreed-upon rule.

In implementations, the reserved field may be located at the end of the data to be stored.

Generating the data metadata of the data to be stored in the target data may include:

determining the data to be stored and the reserved field in the target data based on a preset size of the reserved field; and generating the data metadata of the data to be stored.

In implementations, the storing end can generate the data metadata based on the data to be stored.

In addition, the requesting end may also send request metadata to the storing end, and the storing end may determine the data to be stored in the target data according to a data length and/or a data location of the data to be stored in the request metadata.

The request metadata may also indicate to which storage device the storing end stores the data to be stored, etc.

The data metadata may be generated based on the request metadata and the data to be stored.

In a distributed storage system, a situation in which data to be stored is sent to multiple data storage nodes for storage (for example, when the data to be stored is copy data) exists. Based on the description in the foregoing embodiments, target data and at least one piece of request metadata may be included in data that is sent by a requesting end to a storing end.

In implementations, obtaining the target data may include:

receiving a write request sent by a requesting end, the write request including the target data and at least one piece of request metadata; and determining target request metadata.

Generating the data metadata of the data to be stored in the target data includes:

reading the data to be stored based on the target request metadata; and generating the data metadata based on the target request metadata and the data to be stored.

For example, the target request metadata may include a data size of the data to be stored, and the data size of the data to be stored may be used as information of the data metadata. Other information included in the data metadata, such as a data checksum, can be generated based on the data to be stored. The data checksum can be implemented using a CRC (Cyclic Redundancy Check, Cyclic Redundancy Check) algorithm, which is the same as an existing technology which is not repeated herein.

If the requesting end sends the target data according to the embodiments shown in FIG. 3, the write request of the requesting end may include the target data requested to be sent by the requesting end, the target request metadata, and request metadata that is located before the target request metadata in the first memory.

In implementations, determining the target request metadata may include:

reading the target request metadata from the end of data of the write request based on a data size of the request metadata.

In implementations, based on the target request metadata, the data to be stored can be read from the sent data.

By taking data to be stored in a distributed storage system as copy data as an example, the technical solutions of the embodiments of the present disclosure will be described below. In distributed storage systems, multi-copy technology is usually used to solve the problems of losses of original data due to failures.

Figure 6:
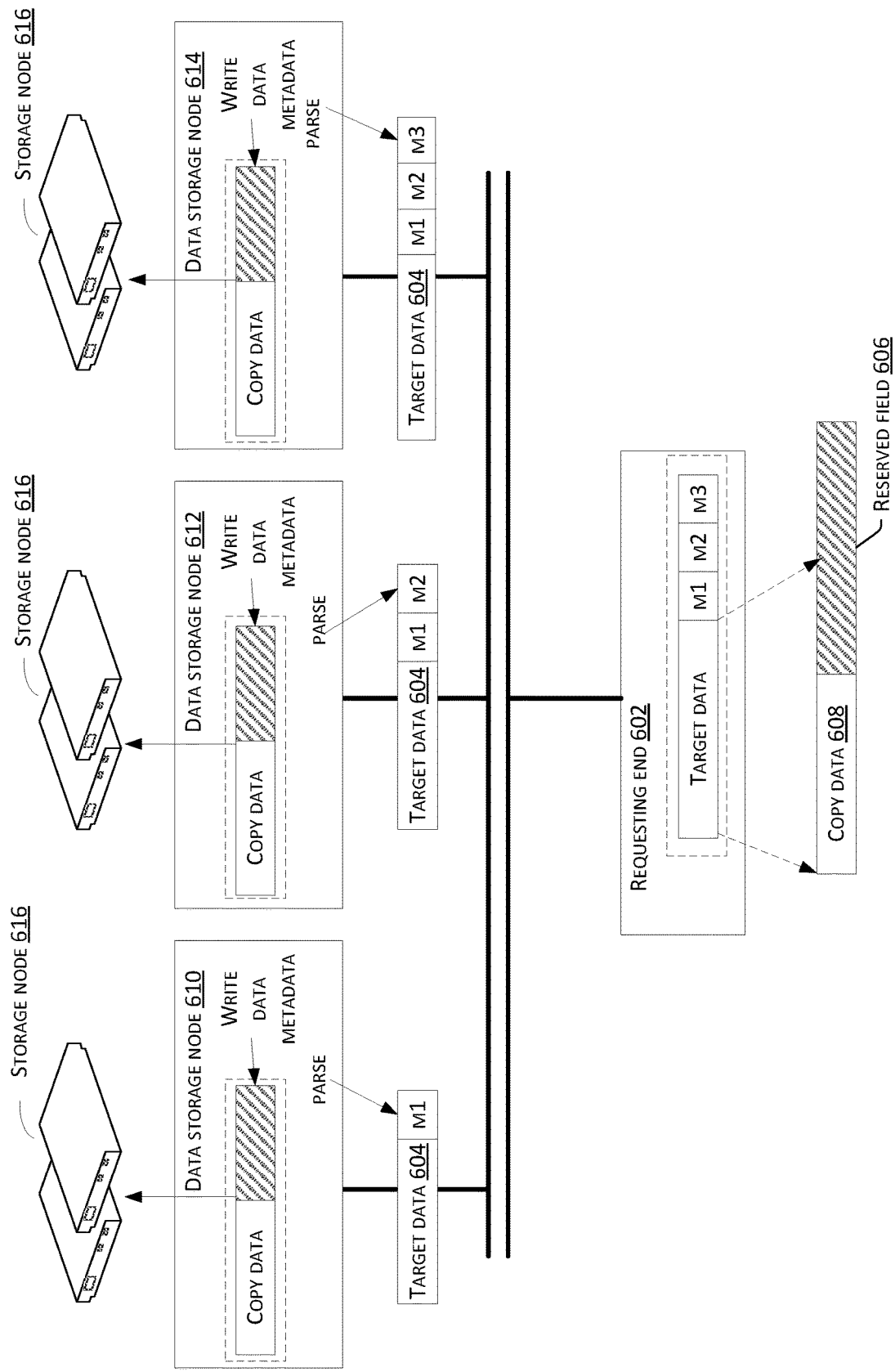
FIG. 6 shows a schematic diagram of a data processing interaction in a practical application provided by the embodiments of the present disclosure.

As shown in FIG. 6, a requesting end 602 first constructs target data 604, and adds a reserved field 606 at the end of copy data 608. The reserved field may be formed by adding an empty character string of a preset size at the end of the copy data.

Three data storage nodes are assumed to receive the copy data, including a first data storage node 610, a second data storage node 612, and a third data storage node 614 respectively. In other words, the requesting end needs to send the copy data to the three data storage nodes. The requesting end separately determines respective pieces of request metadata corresponding to each of the three data storage nodes that are needed. A piece of request metadata corresponding to the first data storage node 610 is assumed to be m1. A piece of request metadata corresponding to the second data storage node 612 is assumed to be m2. A piece of request metadata corresponding to the third data storage node 614 is assumed to be m3.

The requesting end applies for a first memory, writes the target data 604 into the first memory, and sequentially places three pieces of request metadata at the end of the target data 604 according to a sending order of the three data storage nodes (assuming that the sending order is: the first data storage node 610, the second data storage node 612, and the third data storage node 614) and, with an order of arrangement of the three pieces of request metadata as: m1, m2, and m3.

For any data storage node, the requesting end can read the copy data and a piece of request metadata corresponding to the any storage node and any piece of request metadata before the piece of request metadata corresponding to the any storage node from the first memory, and send a write request to the any data storage node.

As shown in FIG. 6, the requesting end 602 sends the target data 604 and m1 to the first data storage node 610, sends the target data 604, m1, and m2 to the second data storage node, and sends the target data 604, m1, m2, and m3 to the third data storage node.

Therefore, after any data storage node receives a write request, the any data storage node can read and obtain target request metadata that is different from other data storage nodes from the end of the write request.

Each data storage node can determine the target data from a write request based on a number of pieces of request metadata and a data size of the request metadata, and allocate a second memory to temporarily store the target data.

After that, each data storage node can determine the copy data from the target data based on target request metadata, generate data metadata accordingly, and then write the data metadata into a second memory.

Each data storage node can write the copy data written in the second memory and the data metadata to a respective storage device 616.

As can be seen from the above description, a requesting end applies for a first memory and places pieces of request metadata of three data storage nodes into the first memory at one time, thereby simplifying operations and ensuring the efficiency of data transmission. Moreover, the requesting end adds a reserved field in copy data to form target data, so that a second memory passively allocated by a data storage node for temporary storage of the target data has an enough space for writing data metadata. Therefore, data storage can be achieved without the need of reapplying for a write disk memory, and performing an operation of data copying. By using a scheme of zero copying, the system performance and the efficiency of data storage are improved. Furthermore, there is no need to apply for additional memory, thus reducing the problem of a waste of memory.

Figure 7:
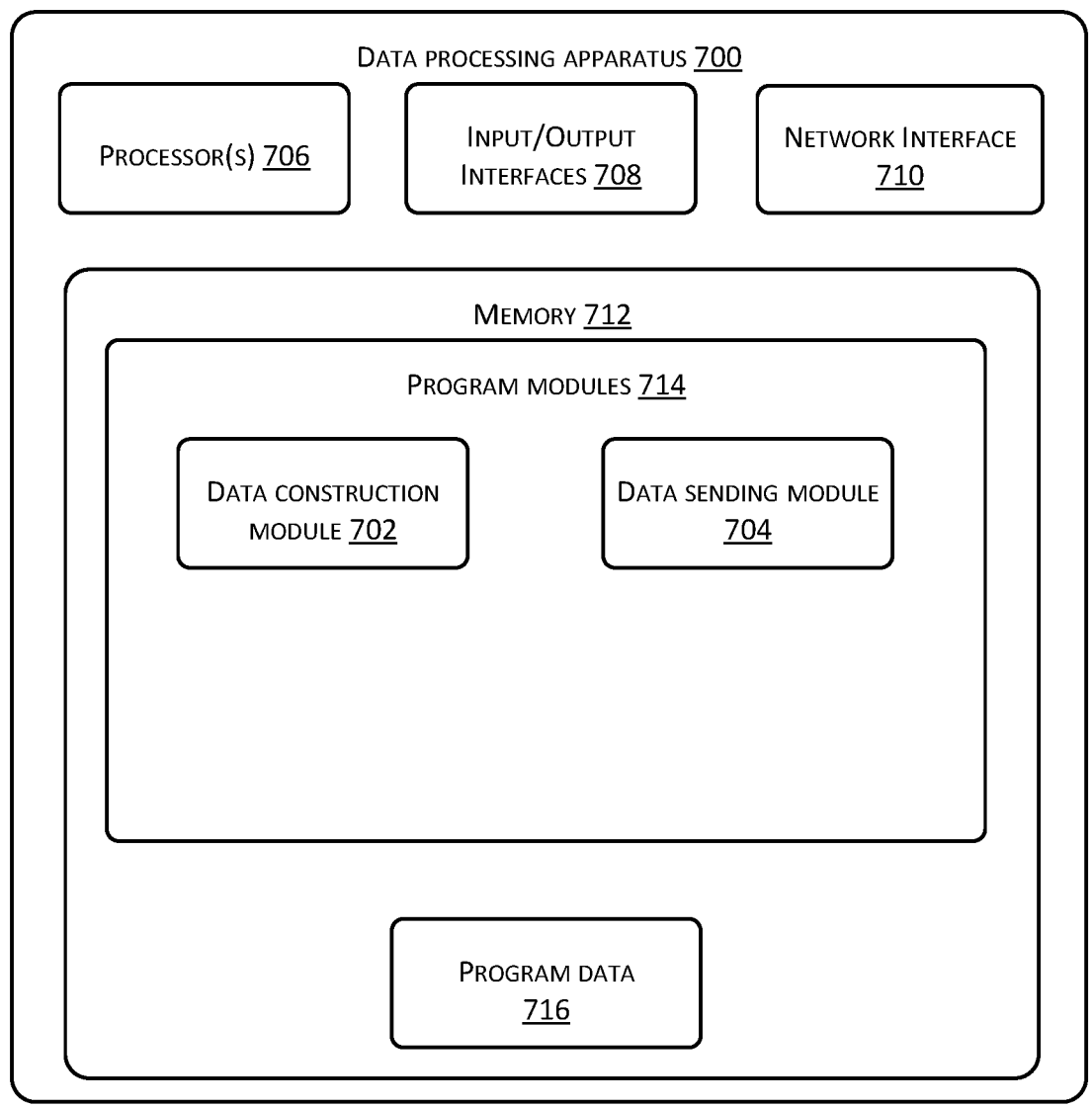
FIG. 7 is a schematic structural diagram of an exemplary data processing apparatus provided by the present disclosure.

FIG. 7 is a schematic structural diagram of an exemplary data processing apparatus 700 according to the present disclosure. The data processing apparatus 700 may be configured in a requesting end. The apparatus 700 may include:

a data construction module 702 configured to add a reserved field to data to be stored to obtain target data; and a data sending module 704 configured to send the target data to a storing end, wherein the reserved field is used for writing data metadata of the data to be stored in a corresponding memory location in the storing end.

In implementations, the data construction module 702 may add a predetermined character string of a preset size as the reserved field at the end of the data to be stored to obtain the target data.

In implementations, a reserved field is added to data to be stored to construct target data. Since a data size of the target data is equal to a sum of a data size of the data to be stored and a data size occupied by the reserved field, a second memory passively allocated by a storing end is large enough for writing data metadata. Therefore, there is no need to apply for additional write disk memory, and no data copy is needed, thus achieving zero copying. This can thus improve the system performance and the efficiency of data storage without causing a waste of memory.

Since the data to be stored needs to be temporarily stored in the memory before being sent, in implementations, the data sending module 704 may be configured to: allocate a first memory that is consistent with a data size of the target data, place the target data into the first memory, send the target data in the first memory to the storing end.

Request metadata may also be sent to the storing end, and the storing end may determine the data to be stored in the target data according to a data length and/or a data position of the data to be stored in the request metadata.

The request metadata may also indicate to which storage device the storing end stores the data to be stored.

Since the data to be stored needs to be temporarily stored in the memory before being sent, the request metadata can also be placed into the memory, so that the data to be stored and the request metadata can be sent together.

In implementations, the data sending module 704 may be configured to:

calculate a total data size of the target data and the request metadata;

allocate a first memory consistent with the total data size;

place the target memory and the request metadata into the first memory; and send the target data from the first memory to the storing end.

In implementations, the technical solutions of the present disclosure can be applied to a distributed storage system. In a distributed storage system, in order to avoid a data loss caused by a failure of a certain data storage node, a multi-copy technology is usually adopted to make a number of copies of original data, and each copy of the data is stored in a different data storage node. Each copy data of the original data is copy data. Therefore, the data to be stored may be referred to as copy data.

Since a distributed storage system is formed by a number of data storage nodes forming a cluster system, there is a need to send data to be stored to multiple data storage nodes for storage. For example, when the data to be stored is copy data, the copy data needs to be sent separately to multiple data storage nodes.

In implementations, the storing end may include multiple data storage nodes.

In implementations, the data sending module 704 may be configured to:

determine multiple pieces of request metadata of the multiple data storage nodes separately corresponding to the data to be stored;

calculate a total data size of the target data and the multiple pieces of request metadata;

allocate a first memory consistent with the total data size;

place the target memory and the multiple pieces of request metadata into the first memory; and separately send the target data and a corresponding piece of request metadata to the multiple data storage nodes.

In implementations, the data sending module 704 may be configured to:

determine multiple pieces of request metadata of the multiple data storage nodes separately corresponding to the data to be stored;

calculate a total data size of the target data and the multiple pieces of request metadata;

allocate a first memory consistent with the total data size;

place the target data into the first memory, and sequentially place the multiple pieces of request metadata at the end of the target data; and send, for any data storage node, the target data, a piece of request metadata corresponding to the any data storage node, and piece(s) of request metadata located before the piece of request metadata corresponding to the any data storage node in the first memory to the any storage node, the any data storage node being configured to read a corresponding piece of request metadata from the end of received data.

In implementations, the data sending module 704 sequentially placing the multiple pieces of request metadata at the end of the target data may include: sequentially placing respective pieces of request metadata corresponding to the multiple data storage nodes at the end of the target data according to a sending order of the multiple data storage nodes.

The data sending module 704 sending, for any data storage node, the target data, the piece of request metadata corresponding to the any data storage node, and the piece(s) of request metadata located before the piece of request metadata corresponding to the any data storage node in the first memory to the any storage node may include: sending, for the any data storage node, the target data, the piece of request metadata corresponds to a sending order of the any data storage node, and the piece(s) of request metadata located before the piece of request metadata corresponding to the sending order of the any data storage node from the first memory to the any storage node.

In implementations, the data processing apparatus 700 may further include one or more processors 706, an input/output (I/O) interface 708, a network interface 710, and a memory 712. In implementations, the memory 712 may include program modules 714 and program data 716. The program modules 714 may include one or more of the foregoing modules as described in FIG. 7.

In implementations, the memory 712 may include a form of computer readable media such as a volatile memory, a random access memory (RAM) and/or a non-volatile memory, for example, a read-only memory (ROM) or a flash RAM. The memory 712 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 8:
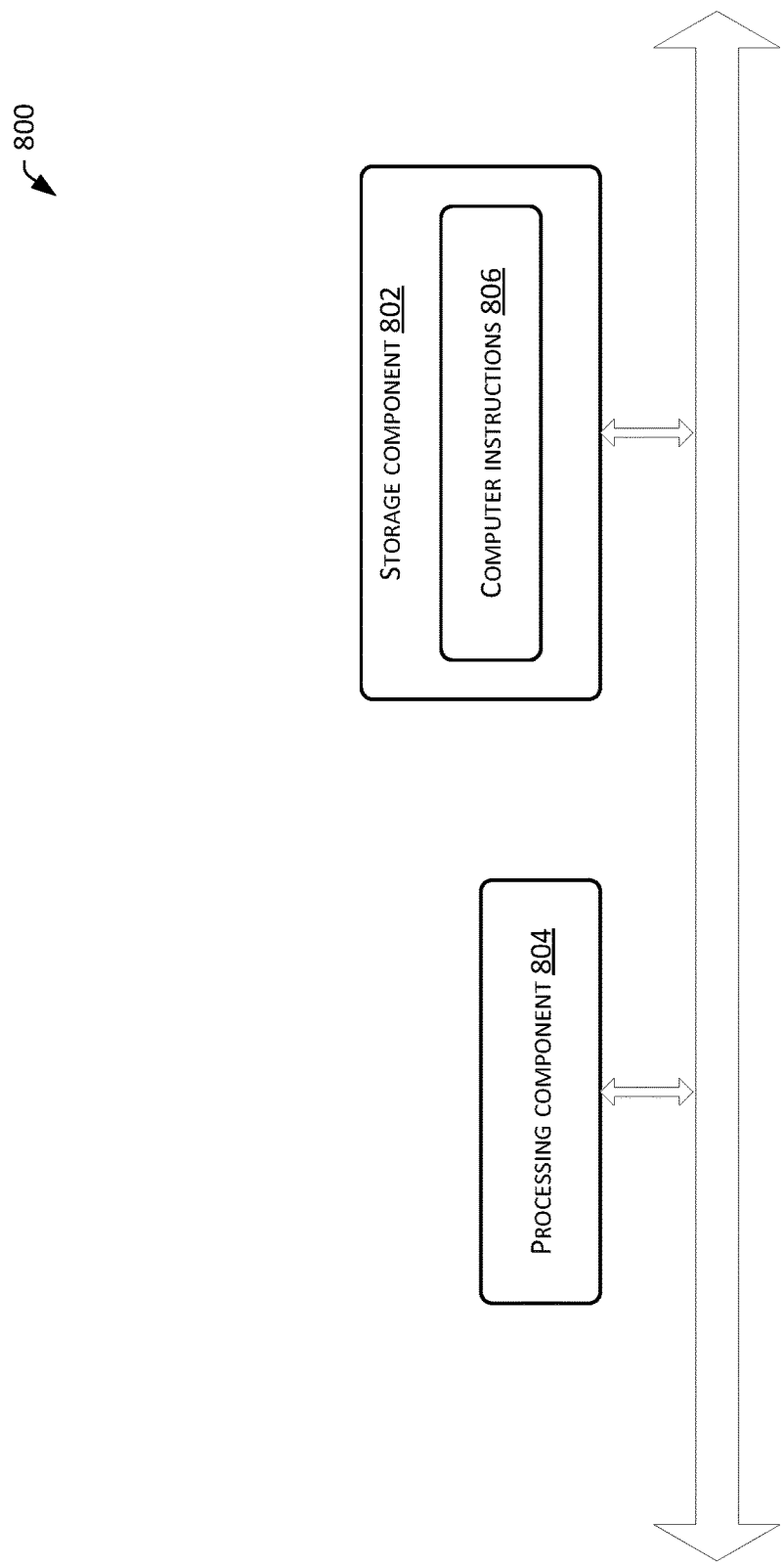
FIG. 8 is a schematic structural diagram of an exemplary computing device provided by the present disclosure.

In a possible design, the data processing apparatus 700 as shown in FIG. 7 may be implemented as a computing device. The computing device is deployed at a requesting end, which may be a request server. As shown in FIG. 8, a computing device 800 may include a storage component 802 and a processing component 804.

The storage component 802 is configured to store one or more computer instructions 806, wherein the one or more computer instructions 806 are provided to the processing component 804 for calling and execution.

The processing component 804 is configured to:

add a reserved field to data to be stored to obtain target data; and send the target data to a storing end, wherein the reserved field is used for writing data metadata of the data to be stored in a corresponding memory location in the storing end.

The processing component 804 may apply a first memory for caching the target data and/or request metadata in the storage component 802.

In addition, the processing component 804 may also be configured to execute the data processing method(s) described in any one of the embodiments as shown in FIGS. 1 to 3 above.

The processing component 804 may include one or more processors to execute computer instructions 806 to complete all or part of the operations in the above method(s). Apparently, the processing component may also be one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic components to implement the above method(s).

The storage component 802 is configured to store various types of data to support operations on the computing device. The memory can be implemented by any type of volatile or non-volatile storage device or a combination thereof, such as a static random access memory (SRAM), an electrically erasable programmable read-only memory (EEPROM), an erasable and programmable Read only memory (EPROM), a programmable read only memory (PROM), a read only memory (ROM), a magnetic storage device, a flash memory, a magnetic disk or optical disk.

In implementations, the computing device 800 may also include other components, such as input/output interfaces, communication components, etc.

In addition, the embodiments of the present disclosure also provide a computer-readable storage medium that stores a computer program, and the computer program, when executed by a computer, can implement the data processing method as shown in any one of the embodiments in FIGS. 1-3.

Figure 9:
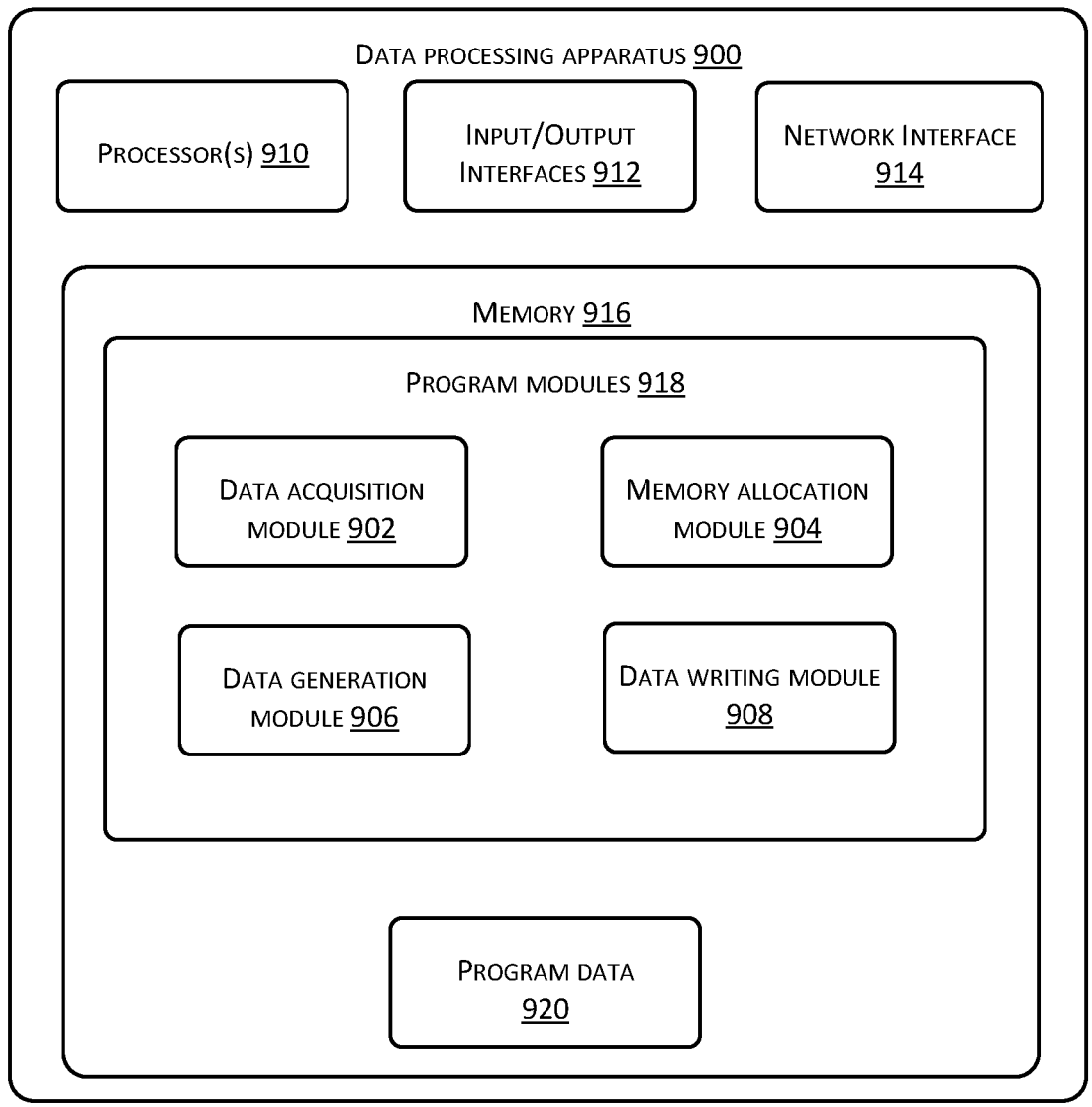
FIG. 9 shows a schematic structural diagram of another exemplary data processing apparatus provided by the present disclosure.

FIG. 9 is a schematic structural diagram of another exemplary data processing apparatus 900 provided by the present disclosure. The apparatus 900 may be configured on a storing end, and the apparatus 900 may include:

a data acquisition module 902 configured to obtain target data, the target data including a reserved field added by a requesting end to data to be stored;

a memory allocation module 904 configured to allocate a second memory to cache the target data;

a data generation module 906 configured to generate data metadata of the data to be stored in the target data; and a data writing module 908 configured to write the data metadata to a memory location corresponding to the reserved field in the second memory.

A data size occupied by the reserved field is greater than or equal to a data size of the data metadata. Therefore, there is sufficient space in the second memory for writing the data metadata, and the storing end does not need to allocate additional write disk memory. The data metadata is written to a storage device without data copying, thus achieving zero copying. Therefore, the system performance and the efficiency of data storage can be improved without causing a waste of memory.

In implementations, a location of the reserved field in the target data and a location of the data to be stored can be agreed upon with the requesting end. For example, the last 32 bytes in the target data correspond to the reserved field. The storing end can read the data to be stored from the target data and determine the reserved field based on such agreed-upon rule.

In implementations, the reserved field may be located at the end of the data to be stored.

The data generation module 906 may be configured to determine the data to be stored and the reserved field in the target data based on a preset size of the reserved field; and generate the data metadata of the data to be stored.

In addition, the requesting end may also send request metadata to the storing end. In implementations, the data acquisition module 902 may be configured to:

receive a write request sent by the requesting end, the write request including the target data and at least one piece of request metadata; and determine target request metadata.

The data generation module 906 may be configured to: read the data to be stored from the sent data based on the target request metadata; and generate the data metadata based on the target request metadata and the data to be stored.

In implementations, the write request may include the target data, the target request metadata, and request metadata before the target request metadata that the requesting end requests to send from a first memory.

The data acquisition module 902 determining the target request metadata may specifically include: reading the target request metadata from the end of the write request based on a data size of the request metadata.

In implementations, the data processing apparatus 900 may further include one or more processors 910, an input/output (I/O) interface 912, a network interface 914, and a memory 916. In implementations, the memory 916 may include program modules 918 and program data 920. The program modules 918 may include one or more of the foregoing modules as described in FIG. 9. In implementations, the memory 916 may include a form of computer readable media as described in the foregoing description.

Figure 10:
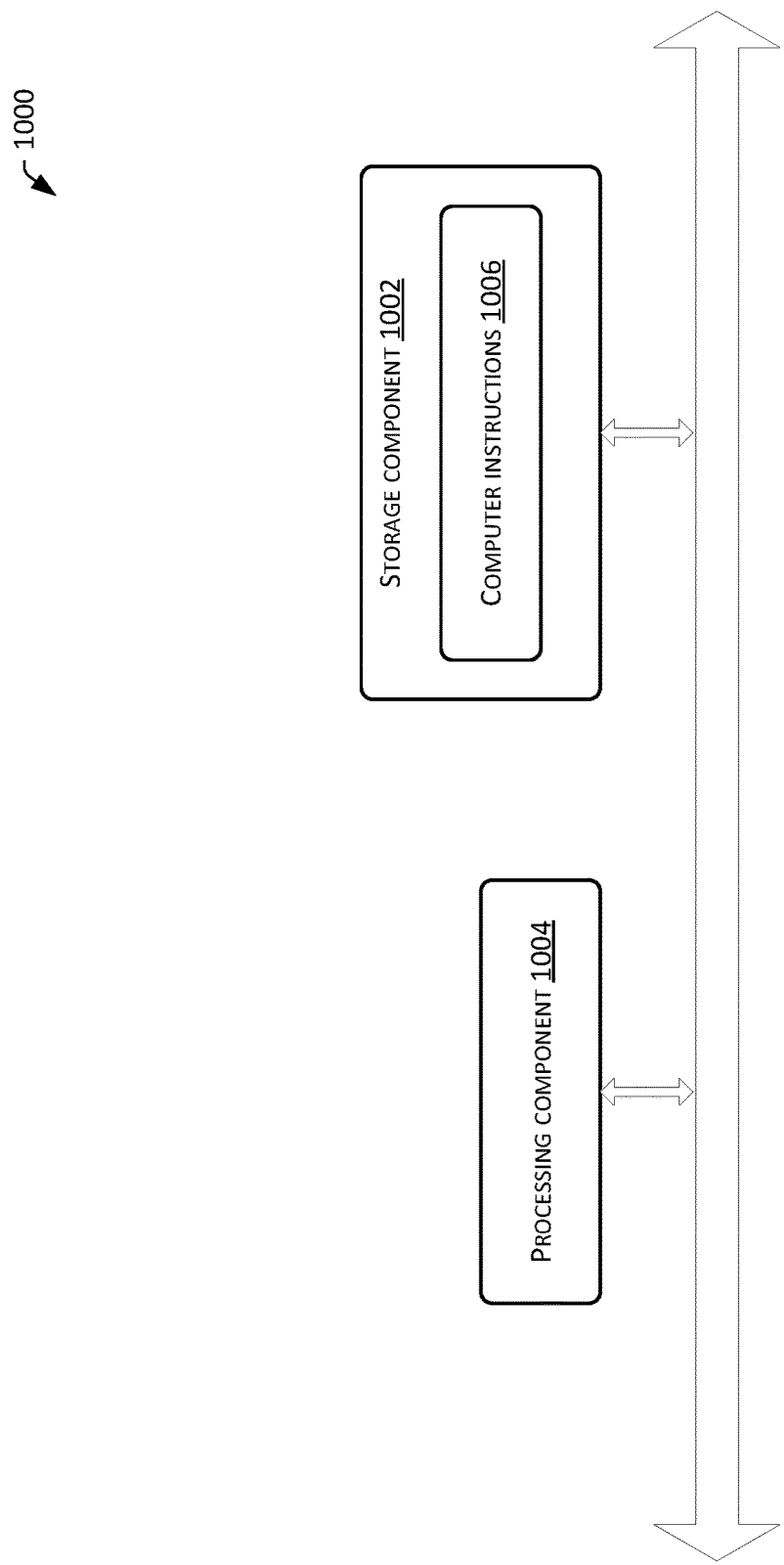
FIG. 10 shows a schematic structural diagram of another exemplary computing device apparatus provided by the present disclosure.

In a possible design, the data processing apparatus 900 as shown in FIG. 9 may be implemented as a computing device. The computing device may be a storage server in a conventional storage system or a data storage node in a distributed storage system, which may be a physical server. As shown in FIG. 10, a computing device 1000 may include a storage component 1002 and a processing component 1004.

The storage component 1002 is configured to store one or more computer instructions 1006, wherein the one or more computer instructions 1006 are provided to the processing component 1004 for calling and execution.

The processing component 1004 is configured to:

obtain target data, the target data including a reserved field added by a requesting end to data to be stored;

allocate a second memory in the storage component 1002 to cache the target data;

generate data metadata of the data to be stored in the target data; and write the data metadata to a memory location corresponding to the reserved field in the second memory.

In addition, the processing component 1004 may also be used to execute the data processing method(s) described in any of the above embodiments.

The processing component 1004 may include one or more processors to execute computer instructions 1006 to complete all or part of the operations in the above method(s). Apparently, the processing component may also be one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic components to implement the above method(s).

The storage component 1002 is configured to store various types of data to support operations on the computing device. The memory can be implemented by any type of volatile or non-volatile storage device or a combination thereof, such as a static random access memory (SRAM), an electrically erasable programmable read-only memory (EEPROM), an erasable and programmable Read only memory (EPROM), a programmable read only memory (PROM), a read only memory (ROM), a magnetic storage device, a flash memory, a magnetic disk or optical disk.

In implementations, the computing device may also include other components, such as input/output interfaces, communication components, etc.

In addition, the embodiments of the present disclosure also provide a computer-readable storage medium that stores a computer program, and the computer program, when executed by a computer, can implement the data processing method as shown in any one of the embodiments in FIG. 4.

One skilled in the art can clearly understand that specific working process of the systems, apparatuses and units described above can be referenced to corresponding processes in the foregoing method embodiments, which are not repeated herein, for the convenience and simplicity of description.

The apparatus embodiments described above are only schematic, in which the units that are described as separate components may or may not be physically separated. The components that are displayed as units may or may not be physical units, i.e., may be located in a single place, or may be distributed among multiple network units. Some or all of the modules may be selected according to actual needs to achieve the purpose of the solutions of the present disclosure. One of ordinary skill in the art can understand and implement thereof without making any creative effort.

Through the description of the above embodiments, one skilled in the art can clearly understand that each embodiment can be implemented by means of software plus a necessary general hardware platform, and apparently can also be implemented by hardware. Based on such understanding, the essence of above technical solutions or the part that contributes to the existing technologies can be embodied in a form of software products. Such computer software product can be stored in a computer-readable storage media, such as ROM/RAM, a magnetic disk, an optical disk, etc., and include a number of instructions to enable a computing device (which may be a personal computer, a server, or a network device, etc.) to perform the method(s) described in various embodiments or certain parts of the embodiments.

Finally, it should be noted that the above embodiments are only used to illustrate, but not limit, the technical solutions of the present disclosure. Although the present disclosure has been described in detail with reference to the foregoing embodiments, one of ordinary skill in the art should understand that modifications can be performed on the technical solutions described in the foregoing embodiments, or some of the technical features can be equivalently replaced. These modifications or replacements do not deviate the essence of corresponding technical solutions from the spirit and scope of the technical solutions of the embodiments of the present disclosure.

The present disclosure can be further understood using the following clauses.

Clause 1: A data processing method comprising: adding a reserved field to data to be stored to obtain target data; and sending the target data to a storing end, wherein the reserved field is used for writing data metadata of the data to be stored in a corresponding memory location in the storing end, so that the data to be stored and the data metadata are written into a storage device as a whole.

Clause 2: The method of Clause 1, wherein the storing end comprises multiple storage nodes, and sending the target data to the storing end comprises: determining multiple pieces of request metadata of the multiple data storage nodes separately corresponding to the data to be stored; calculating a total data size of the target data and the multiple pieces of request metadata; allocating a first memory that is consistent with the total data size; placing the target data and the multiple pieces of request metadata into the first memory; and separately sending the target data and a corresponding piece of request metadata to each of the data storage nodes.

Clause 3: The method of Clause 1, wherein the storing end comprises multiple storage nodes, and sending the target data to the storing end comprises: determining multiple pieces of request metadata of the multiple data storage nodes separately corresponding to the data to be stored; calculating a total data size of the target data and the multiple pieces of request metadata; allocating a first memory that is consistent with the total data size; placing the target data into the first memory, and sequentially placing the multiple pieces of request metadata at an end of the target data; and sending, for any data storage node, the target data, a piece of request metadata corresponding to the any data storage node, and piece(s) of request metadata located before the piece of request metadata corresponding to the any data storage node in the first memory to the any storage node, the any data storage node being configured to read a corresponding piece of request metadata from the end of received data.

Clause 4: The method of Clause 3, wherein: sequentially placing the multiple pieces of request metadata at the end of the target data comprises: sequentially placing respective pieces of request metadata corresponding to the multiple data storage nodes at the end of the target data according to a sending order of the multiple data storage nodes; and sending, for the any data storage node, the target data, the piece of request metadata corresponding to the any data storage node, and the piece(s) of request metadata located before the piece of request metadata corresponding to the any data storage node in the first memory to the any storage node comprises: sending, for the any data storage node, the target data, the piece of request metadata corresponds to the sending order of the any data storage node, and the piece(s) of request metadata located before the piece of request metadata corresponding to the sending order of the any data storage node from the first memory to the any storage node.

Clause 5: The method of Clause 1, wherein adding the reserved field to the data to be stored to obtain the target data comprises: adding a predetermined character string of a preset size as the reserved field at an end of the data to be stored to obtain the target data.

Clause 6: The method of Clause 1, wherein sending the target data to the storing end comprises: allocating a first memory that is consistent with a data size of the target data; placing the target data into the first memory; and sending the target data from the first memory to the storing end.

Clause 7: A data processing method comprising: obtaining target data, the target data including a reserved field added by a requesting end to data to be stored; allocating a second memory to cache the target data; generating data metadata of the data to be stored in the target data; and writing the data metadata to a memory location corresponding to the reserved field in the second memory.

Clause 8: The method of Clause 7, wherein the reserved field is located at an end of the data to be stored, and generating the data metadata of the data to be stored in the target data comprises: determining the data to be stored in the target data based on a preset size of the reserved field; and generating the data metadata of the data to be stored.

Clause 9: The method of Clause 7, wherein: obtaining the target data comprises: receiving a write request sent by a requesting end, the write request including the target data and at least one piece of request metadata; and determining target request metadata; generating the data metadata of the data to be stored in the target data comprises: reading the data to be stored based on the target request metadata; and generating the data metadata based on the target request metadata and the data to be stored.

Clause 10: The method of Clause 9, wherein the write request of the requesting end comprises the target data requested to be sent by the requesting end, the target request metadata, and request metadata that is located before the target request metadata in the first memory; and determining the target request metadata comprises: reading the target request metadata from an end of the write request based on a data size of the request metadata.

Clause 11: A data processing apparatus comprising: a data construction module configured to add a reserved field to data to be stored to obtain target data; and a data sending module configured to send the target data to a storing end, wherein the reserved field is used for writing data metadata of the data to be stored in a corresponding memory location in the storing end, so that the data to be stored and the data metadata are written into a storage device as a whole.

Clause 12: A data processing apparatus comprising: a data acquisition module configured to obtain target data, the target data including a reserved field added by a requesting end to data to be stored; a memory allocation module configured to allocate a second memory to cache the target data; a data generation module configured to generate data metadata of the data to be stored in the target data; and a data writing module configured to write the data metadata to a memory location corresponding to the reserved field in the second memory.

Clause 13: A computing device comprising: a storage component and a processing component, the storage component being configured to store one or more computer instructions, wherein the one or more computer instructions are provided to the processing component for calling and execution; and the processing component being configured to: add a reserved field to data to be stored to obtain target data; and send the target data to a storing end, wherein the reserved field is used for writing data metadata of the data to be stored in a corresponding memory location in the storing end, so that the data to be stored and the data metadata are written into a storage device as a whole.

Clause 14: A computing device comprising: a storage component and a processing component, the storage component being configured to store one or more computer instructions, wherein the one or more computer instructions are provided to the processing component for calling and execution; and the processing component being configured to: obtain target data, the target data including a reserved field added by a requesting end to data to be stored; allocate a second memory to cache the target data; generate data metadata of the data to be stored in the target data; and write the data metadata to a memory location corresponding to the reserved field in the second memory.

What is claimed is:

1. A method implemented by a computing device, the method comprising:
   adding a reserved field to data to be stored to obtain target data; and
   sending the target data to a storing end that includes multiple data storage nodes, sending the target data to the storing end comprising:
     determining multiple pieces of request metadata of the multiple data storage nodes separately corresponding to the data to be stored;
     calculating a total data size of the target data and the multiple pieces of request metadata; and
     allocating a first memory that is consistent with the total data size, wherein the reserved field is used for writing data metadata of the data to be stored in a corresponding memory location in the storing end, so that the data to be stored and the data metadata are written into a storage device as a whole.

2. The method of claim 1 wherein sending the target data to the storing end further comprises:
   placing the target data and the multiple pieces of request metadata into the first memory; and
   separately sending the target data and a corresponding piece of request metadata to each of the multiple data storage nodes.

3. The method of claim 1 wherein sending the target data to the storing end further comprises:
   placing the target data into the first memory, and sequentially placing the multiple pieces of request metadata at an end of the target data; and
   sending, for any data storage node of the multiple data storage nodes, the target data, a piece of request metadata corresponding to the any data storage node, and one or more pieces of request metadata located before the piece of request metadata corresponding to the any data storage node in the first memory to the any storage node, the any data storage node being configured to read a corresponding piece of request metadata from the end of received data.

4. The method of claim 3, wherein sequentially placing the multiple pieces of request metadata at the end of the target data comprises:
   sequentially placing respective pieces of request metadata corresponding to the multiple data storage nodes at the end of the target data according to a sending order of the multiple data storage nodes.

5. The method of claim 4, wherein sending, for the any data storage node of the multiple data storage nodes, the target data, the piece of request metadata corresponding to the any data storage node, and the one or more pieces of request metadata located before the piece of request metadata corresponding to the any data storage node in the first memory to the any storage node comprises:
   sending, for the any data storage node, the target data, the piece of request metadata corresponds to the sending order of the any data storage node, and the one or more pieces of request metadata located before the piece of request metadata corresponding to the sending order of the any data storage node from the first memory to the any storage node.

6. The method of claim 1, wherein adding the reserved field to the data to be stored to obtain the target data comprises:
   adding a predetermined character string of a preset size as the reserved field at an end of the data to be stored to obtain the target data.

7. The method of claim 1, wherein sending the target data to the storing end comprises:
   placing the target data into the first memory; and
   sending the target data from the first memory to the storing end.

8. One or more computer readable media storing executable instructions that, when executed by one or more processors of a storing end that includes multiple data storage nodes, cause the one or more processors to perform acts comprising:
   obtaining target data from a first memory of a requesting end that is consistent with a total data size of the target data and multiple pieces of request metadata of the multiple data storage nodes of the storing end, the target data including a reserved field added by the requesting end to write data, wherein the multiple pieces of request metadata of the multiple data storage nodes separately correspond to the write data;
   allocating a second memory to cache the target data;
   generating data metadata of the write data; and
   writing the data metadata to a memory location corresponding to the reserved field in the second memory.

9. The one or more computer readable media of claim 8, wherein the reserved field is located at an end of the write data, and generating the data metadata of the write data comprises:
   determining the write data based on a preset size of the reserved field; and
   generating the data metadata of the write data.

10. The one or more computer readable media of claim 8, wherein obtaining the target data comprises:
    receiving a write request sent by the requesting end, the write request including the target data and at least one piece of the multiple pieces of request metadata; and
    determining target request metadata.

11. The one or more computer readable media of claim 10, wherein generating the data metadata of the write data comprises:
    reading the write data based on the target request metadata; and
    generating the data metadata based on the target request metadata and the write data.

12. The one or more computer readable media of claim 11, wherein the write request of the requesting end comprises the target data requested to be sent by the requesting end, the target request metadata, and request metadata that is located before the target request metadata in the first memory.

13. The one or more computer readable media of claim 12, wherein determining the target request metadata comprises:
    reading the target request metadata from an end of the write request based on a data size of the request metadata that is located before the target request metadata in the first memory.

14. An apparatus comprising:
    one or more processors;
    memory;
    a data construction module stored in the memory and executable by the one or more processors to add a reserved field to data to be stored to obtain target data; and
    a data sending module stored in the memory and executable by the one or more processors to send the target data to a storing end that includes multiple data storage nodes, determine multiple pieces of request metadata of the multiple data storage nodes separately corresponding to the data to be stored, calculate a total data size of the target data and the multiple pieces of request metadata, and allocate a first memory consistent with the total data size, wherein the reserved field is used for writing data metadata of the data to be stored in a corresponding memory location in the storing end, so that the data to be stored and the data metadata are written into a storage device as a whole.

15. The apparatus of claim 14, wherein the data construction module is further configured to add a predetermined character string of a preset size as the reserved field at the end of the data to be stored to obtain the target data.

16. The apparatus of claim 14, wherein the data sending module is further configured to:
    place the target data into the first memory; and
    send the target data in the first memory to the storing end.

17. The apparatus of claim 14, wherein the data construction module is further configured to determine the data to be stored according to a data length and/or a data position of the data to be stored in the multiple pieces of request metadata.

18. The apparatus of claim 14, wherein the data sending module is further configured to:
    place the target data and the multiple pieces of request metadata into the first memory; and
    separately send the target data and a corresponding piece of request metadata to the multiple data storage nodes.

* * * * *